Patented Feb. 4, 1936

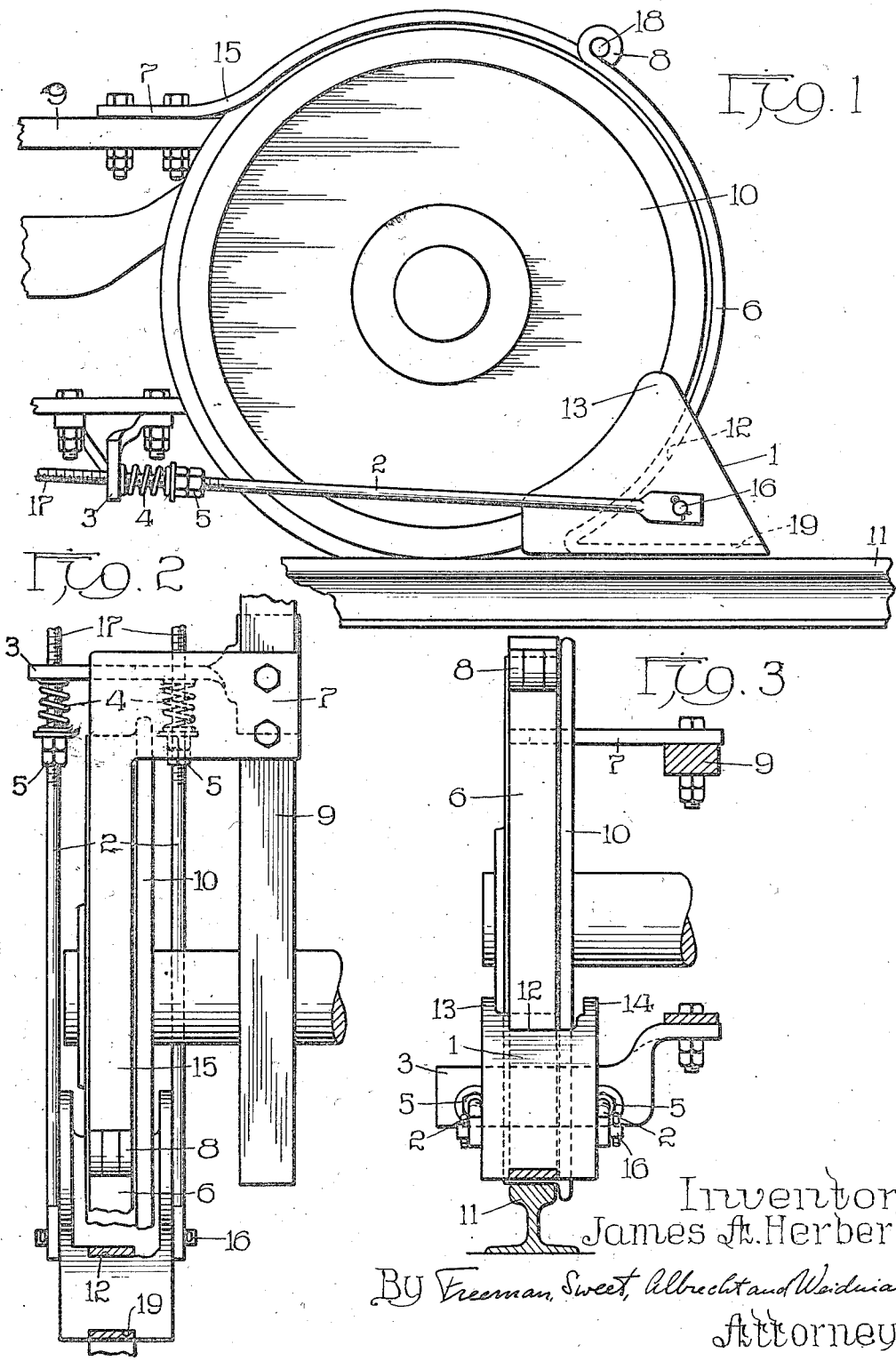

2,029,923

UNITED STATES PATENT OFFICE 2,029,923

SAFETY APPLIANCE FOR FLANGED WHEELS

James A. Herbert, Cleveland, Ohio; Elizabeth A. Herbert, executrix of said James A. Herbert, deceased, assignor of one-fourth to Gilbert Morgan, Cleveland, Ohio Application July 29, 1932, Serial No. 625,795

8 Claims. (Cl. 104—279)

My invention relates to a safety appliance for flanged wheels to prevent objects from coming under the wheels of any vehicle which travels on rails. Derailment is often caused by the wheel being lifted from the rail so that the flange holding the wheel on the rail is raised over the top of the rail. The wheel of any vehicle traveling on a rail may be lifted up by objects which come on the track by reason of the carelessness of workers, objects put on the rail by children, objects put upon the track with intent of wrecking the car or train, objects which are washed onto the rail in storms and objects which come upon the rail by reason of collision between the vehicle traveling on the rail and other vehicles or objects which are crossing the rails or placed across the rails as the vehicle approaches on the rails. My invention affords facilities for pushing or propelling any object from the rail thereby preventing it from coming under the wheel and causing derailment.

The invention consists in certain novel constructions and combinations and arrangements of parts with the truck frame and wheel of a vehicle that travels on a rail, as will hereafter be more fully set forth and claimed. In the accompanying drawing I have illustrated one complete example of the physical embodiment of my invention wherein the parts are combined and arranged according to one mode I have thus far devised for the practical application of the principles of my invention.

My invention is a block, shoe, or piece of suitable material kept in place or suspended in convenient manner and held immediately in front of a wheel traveling on a rail. Rods to the truck frame allow for adjustment and hold the shoe in place. Such shoe or block is properly formed to fit the wheel if pressed against it and extends in front of the wheel to form the point of contact with any obstruction that might be found there. The shoe is wider than the wheel and thus forms a guard on both sides of the wheel. The lowest part of it travels at a point over the rail nearer thereto than the height of the flange of the wheel. The appliance as invented by me will maintain such block or shoe in the same relative position with reference to the wheel and in case of collision with any object on the rail will either dislodge the same, or by retroceding against the wheel, will thus, with the wheel, form a solid mass to receive the shock and weight of the collision and slide along the rail and prevent any object from causing the wheel to become raised and thus will prevent the wheel from leaving the rail by being lifted to a height as great or greater than that of the flange, which flange is the only means or method of keeping said wheel on the rail.

My invention is especially adapted to the front pilot wheels of a locomotive where the danger of derailment is greatest on account of the fact that the pilot truck of a locomotive is fastened to the locomotive frame by pivot and has no means or method of being kept in alignment except the operation of the flange on the rail. When the pilot wheels leave the rail the engine and sometimes the entire train is ditched and the pilot truck very often turns perpendicular to the line of the rails and causes the engine to roll over. Thousands of lives have been lost and millions of dollars in damage have been caused by reason of comparatively small objects coming under and raising the pilot wheels of the locomotive higher than the height of the flange. Derailments in collisions with automobiles are very common.

I attain these objects by appliance illustrated in the accompanying drawing, in which Figure 1 is a side elevation of a wheel showing my invention applied thereto;

Figure 2 is a top plan view partly in section; and

Figure 3 is a front view.

In the embodiment selected to illustrate my invention, I make use of a locomotive pilot truck 9 associated with a flanged wheel 10 of standard construction arranged to run upon a rail 11. A block 1 generally triangular in shape in the position of Figure 1, is mounted before the wheel 10 in close relation to the rail 11. The base of the block is spaced from the rail 11 sufficiently far to prevent the block from rubbing on the rail, but is sufficiently close to strike an object upon the rail of a thickness great enough to lift the wheel flange out of guiding relation with the rail.

The side of the block 1 facing the wheel 10 is shaped to conform to the curvature of the wheel and is recessed at 12 to provide flanges 13 and 14 extending partly over the sides of the wheel to guard the same. The base of the block is grooved at 19 to receive a strap 6 shaped to lie within the recess 12 and extend upwardly partly around the periphery of the wheel. This strap has its upper end bifurcated and wrapped about a bolt 18. Similarly, a strap 15, comprising an extension of the bracket 7, is provided with a reduced end fitting between the bifurcated end of the strap 6 and wrapped about the bolt 18, so that the strap 6 is hingedly connected with the strap 15. Thus the weight of the block 1 is supported by the straps.

A pair of rods 2 is pivotally connected with shaft portions 16 carried by the block, which hold the block in predetermined spaced relation with the wheel to prevent rubbing between the block and the wheel. These rods pass through openings in brackets 3 carried by the pilot truck and are threaded at 17 to receive nuts 5 providing abutment for springs 4 engaging the brackets 3. Thus the springs 4 determine the normal position of the block 1 with respect to the wheel. The springs will yield and permit the block to engage the wheel when it strikes a heavy obstruction on the rail, so that the combined weight of the wheel and the block is delivered to the obstruction. The angle of the side of the block opposite the wheel prevents the block from tending to ride over obstructions, so that the wheel will not tend to climb the obstruction, regardless of the size, shape and weight of the obstruction. The joint 8 permits precise adjustment of the block 1 with respect to the wheel at all times.

I claim:

1. A device of the type described, comprising a locomotive pilot truck having flanged wheels arranged to run on rails, an antiderailing block, a connection between the block and the truck to support the block in stationary spaced relation with the wheel and its rail, said block being spaced from the rail a distance less than the guiding height of the flange, whereby the locomotive can run at full speed without contact between rail and block, but at all times with the wheel guarded against any obstruction large enough to lift the wheel flange above the rail.

2. A device of the type described, comprising a locomotive pilot truck having flanged wheels arranged to run on rails, a pair of antiderailing blocks, and connections between the blocks and the truck to support the blocks in stationary spaced relation with the wheels and their respective rails, said blocks being spaced from said rails a distance less than the guiding height of the wheel flanges, whereby the locomotive can run at full speed without contact between rail and block, but at all times with the wheel guarded against any obstruction large enough to lift the wheel flange above the rail.

3. A device of the type described, comprising a locomotive pilot truck having flanged wheels arranged to run on rails, a pair of antiderailing blocks, connections between the blocks and the truck to support the blocks in spaced relation with the wheels and their respective rails, said blocks being spaced from said rails a distance less than the guiding height of the wheel flanges, and yielding means tending to hold said blocks in spaced relation with their respective wheels, and yieldable to permit the blocks to engage the wheels when the blocks strike relatively heavy obstructions.

4. In a power propelled vehicle having flanged wheels arranged to run on rails, an antiderailing block positioned before one of the wheels of said vehicle and in close relation to the rail supporting the wheel, means fastened to said block and extending partly around the periphery of said wheel and connected with the vehicle, to support said block, said block having its side adjacent the wheel shaped to conform to the curvature of the same and flanges extending inwardly of the wheel proper, and spring pressed means for holding the block in spaced relation with its associated wheel.

5. In a power propelled vehicle having flanged wheels arranged to run on rails, an antiderailing block positioned before one of the wheels of said vehicle and in close relation to the rail supporting the wheel, means fastened to said block and extending partly around the periphery of said wheel and connected with the vehicle, to support said block, said block having its sides adjacent the wheel shaped to conform to the curvature of the same and flanges extending inwardly of the wheel proper, spring pressed means for yieldingly holding the block in spaced relation with its associated wheel, said first-named means being provided with a hinge, to permit the block to move toward and away from the wheel in parallelism with its supporting rail, and means for varying the tension of said spring pressed means for adjusting the position of the block with respect to the wheel.

6. In a power propelled vehicle having flanged wheels arranged to run on rails, an antiderailing block, means connected with the vehicle and said block for holding the latter in spaced relation with the wheel and the rail, said means including a yieldable part permitting said block to strike its associated wheel when the blocks hit a relatively heavy obstruction, to permit the combined weight of the block and the wheel to be delivered to the obstruction and dislodge the same.

7. In a power-propelled vehicle having flanged wheels arranged to run on rails, a flanged pilot wheel, a support relatively rigid with respect to the pilot wheel axis, a protecting block riding close over the rail but out of contact therewith, connections between said support and said block permitting horizontal movement of said block but not vertical movement, and resilient means normally holding said block slightly spaced in front of said wheel, whereby an obstacle sufficient to overcome said resilient means is subjected to the impact of the wheel as well as the block.

8. In a power-propelled vehicle having flanged wheels arranged to run on rails, a flanged pilot wheel, a support relatively rigid with respect to the pilot wheel axis, a protecting block riding close over the rail but out of contact therewith, connections between said support and said block permitting horizontal movement of said block but not vertical movement, and resilient means normally holding said block slightly spaced in front of said wheel, whereby an obstacle sufficient to overcome said resilient means is subjected to the impact of the wheel as well as the block, said block having a surface conforming to the curvature of the wheel and positioned to receive the wheel impact.

JAMES A. HERBERT.